US005652698A

United States Patent [19]

Eberts

[11] Patent Number: 5,652,698

[45] Date of Patent: Jul. 29, 1997

[54] BRACKET ASSEMBLY FOR A CIRCUIT BREAKER AND AN ASSOCIATED METHOD

[75] Inventor: William G. Eberts, Coraopolis, Pa.

[73] Assignee: Eaton Corporation, Cleveland, Ohio

[21] Appl. No.: 595,376

[22] Filed: Feb. 1, 1996

[51] Int. Cl.[6] .......... H02B 1/04

[52] U.S. Cl. .......... 361/825; 200/51 R; 248/906; 335/202; 361/823

[58] Field of Search .......... 218/22; 335/8–10, 335/16, 132, 133, 202; 200/51 R, 293, 294, 303; 439/529, 716; 361/823–825, 652, 673; 248/231.9, 309.1, 906

[56] References Cited

U.S. PATENT DOCUMENTS

| | | | |
|---|---|---|---|
| 3,842,322 | 10/1974 | Leonard | 317/119 |
| 4,609,119 | 9/1986 | Richter, Sr. | 220/3.5 |
| 5,438,483 | 8/1995 | Fasano | 361/825 |
| 5,483,213 | 1/1996 | Mueller | 335/132 |
| 5,488,337 | 1/1996 | Hubbard | 335/202 |

*Primary Examiner*—Gerald P. Tolin
*Attorney, Agent, or Firm*—Martin J. Moran

[57] ABSTRACT

A plurality of terminal blocks are secured to a molded case circuit breaker by a bracket assembly which includes a mounting bracket placed against a side wall of the circuit breaker molded case. A back-up plate is inserted in a pocket formed between the outer wall and an inner wall of the molded case and electrically isolated from the cavity containing the circuit breaker operating mechanism. Fasteners extend from the mounting bracket through the outer wall and engage the back-up plate. Since the pocket is electrically isolated from the circuit breaker operating mechanism, the back-up plate, and particularly the fasteners, can be made of metal for a solid, durable connection.

12 Claims, 3 Drawing Sheets

FIG. 1A
PRIOR ART
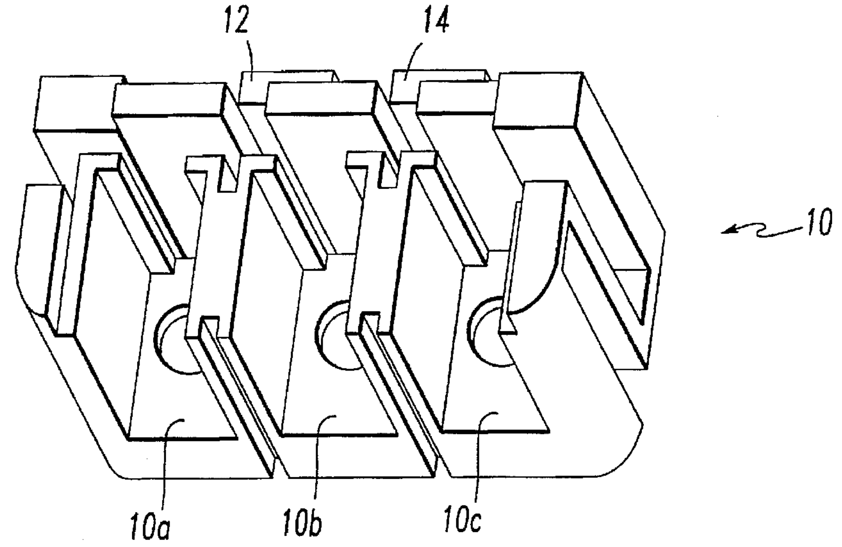
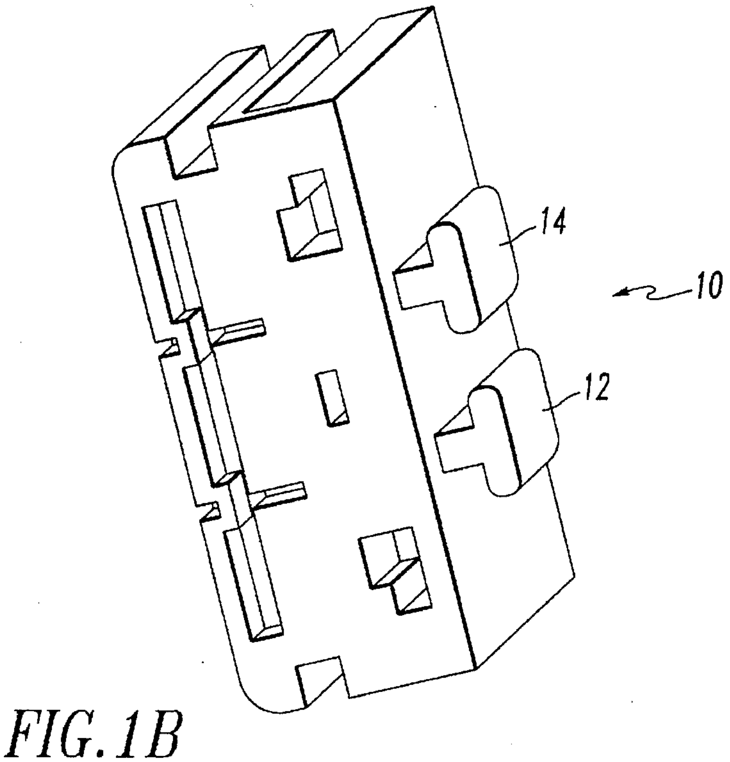
FIG. 1B
PRIOR ART

BRACKET ASSEMBLY FOR A CIRCUIT BREAKER AND AN ASSOCIATED METHOD

BACKGROUND OF THE INVENTION

1. Field of the Invention

This invention relates to a bracket assembly for supporting terminal block means on a circuit breaker and a related method for securing the bracket assembly to the circuit breaker.

2. Background Information

Terminal blocks are mounted on the outside of a circuit breaker and are electrically connected to the circuit breaker by wires which are drawn through horizontal slots in the circuit breaker housing. Terminal blocks are generally connected to auxiliary contact devices such as a bell switch which is used to provide an indication of a tripped condition of the circuit breaker, or connected to a printed circuit board, for remote communications on the functions that the PCB is performing. One arrangement for securing the terminal block to the outside of a circuit breaker consists of a terminal block which has two T-shaped members on its rear wall, each of which fit and slide into a vertical slot on a sidewall of the housing.

Since only two slots are provided on the sidewall of the circuit breaker housing, only one terminal block can be used in conjunction such a circuit breaker. If additional terminal blocks are required, then additional slots need to be provided in the sidewall of the housing, although they would unacceptably weaken the housing. For a particular application, it is apparent that this arrangement has limitations in that the number of slots dictate the number of terminal blocks which can be supported by the circuit breaker.

In order to expand the capacity for supporting a number of terminal blocks, a long bracket has been provided in some installations whereby several terminal blocks are secured to the bracket. A problem with this type of arrangement is that the bracket is unstable or wobbly and cannot be fixedly secured to the circuit breaker housing. A further problem with this arrangement is that since the bracket is mounted flush against the housing, plastic screws are needed to maintain electrical isolation between the inside of the housing which contains the circuit breaker mechanism and the outside of the housing. However, the walls of the housing are generally thin and of poor material for tapping. Thus, plastic screws are not a satisfactory solution. Heavy duty double stick tape has been suggested, but it also does not adequately secure the bracket to the molded housing.

There remains, therefore, a need for a circuit breaker to accommodate several terminal block assemblies alongside its outer housing wall on a bracket assembly which is fixedly secured to the circuit breaker housing and which is electrically isolated from the circuit breaker mechanism.

SUMMARY OF THE INVENTION

The present invention has met the above-described needs. It employs a bracket assembly for a circuit breaker for supporting a plurality of terminal block assemblies. The bracket assembly comprises a bracket member positioned against an outer wall surface of the circuit breaker, a back-up plate positioned against an inner wall surface of the circuit breaker in a pocket outside of a cavity containing the circuit breaker mechanism, and fastening means for securing the bracket member and the back-up plate to the wall of the circuit breaker and to each other. The bracket member, the back-up plate, and the fastening means may be made of metal, such as steel, since no components of the bracket assembly enter into the cavity containing the circuit breaker mechanism. The bracket member has a shelf portion for supporting the several terminal block assemblies and a leg portion which in the exemplary embodiment has an aperture through which several leads are drawn for their electrical connection to devices, such as an auxiliary switch and/or an alarm, a communications system or a remotely located control device. The aperture in the leg portion of the bracket member communicates with a slot in the shelf portion for extending wires from the circuit breaker mechanism through the bracket assembly for their connection to the several terminal block assemblies.

It is, therefore, an object of the present invention to provide support means fixedly and stably secured to the circuit breaker for supporting several terminal block assemblies and comprising components which remain outside of the cavity containing the circuit breaker mechanism.

It is a further object of the present invention to provide a bracket assembly for supporting a plurality of terminal block assemblies and to provide a method for securing the bracket assembly to the circuit breaker housing.

These and other objects of the present invention will be fully understood and appreciated from the following description of the invention upon reference to the illustrations appended hereto.

BRIEF DESCRIPTION OF THE DRAWINGS

A full understanding of the invention can be gained from the following description of the preferred embodiments when read in conjunction with the accompanying drawings in which:

FIG. 1A is an isometric view showing a terminal block assembly of the prior art;

FIG. 1B is an isometric view of the terminal block assembly of FIG. 1A rotated to show the T-shaped members used to mount the terminal block assembly to the circuit breaker housing;

DESCRIPTION OF THE PREFERRED EMBODIMENT

Figure 2:
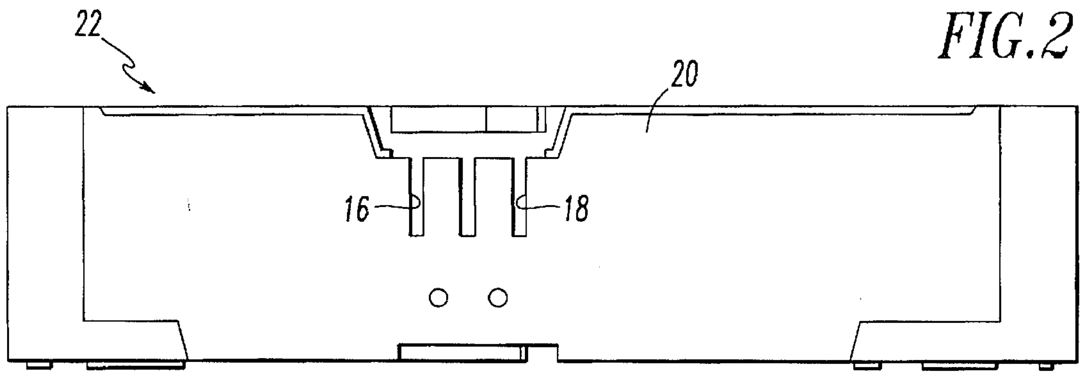
FIG. 2 is an elevational view illustrating a sidewall of a circuit breaker on which the terminal block assembly of the prior art and the bracket assembly of the invention are mounted.

Referring first to FIGS. 1A, 1B, and 2, there is shown in FIGS. 1A and 1B a terminal block assembly 10 of the prior art discussed hereinabove which consists of T-shaped members 12 and 14 which fit and slide into slots 16 and 18 in a sidewall 20 of a circuit breaker 22.

As particularly shown in FIG. 1A, terminal block assembly 10 has three compartments 10*a*, 10*b*, 10*c* which are connected by way of wires (not shown) soldered to pads (also not shown) permanently mounted in the assembly and extending into the circuit breaker, and a screw down clamp (not shown) for the user's wires in a manner well known to those skilled in the art.

Referring to FIGS. 3, 4, 5, and 6 there is shown a bracket assembly 26 of the present invention which is mounted to an outer wall or sidewall 28 (FIG. 3) of a housing for a circuit breaker 24. Circuit breaker 24 is similar to circuit breaker 22 of FIGS. 1A, 1B, and 2, and contains a circuit breaker mechanism (not shown).

Figure 6:
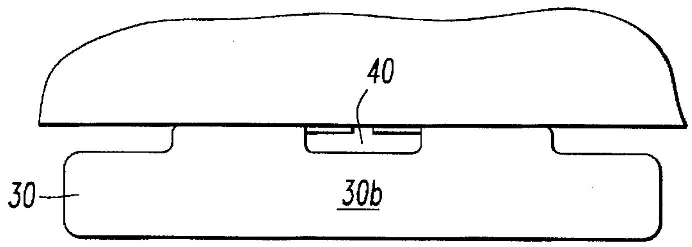
FIG. 6 is a top plan view taken along lines 6—6 of FIG. 4 showing the bracket assembly of the present invention and a partial view of the circuit breaker on which it is mounted.
Figure 4:
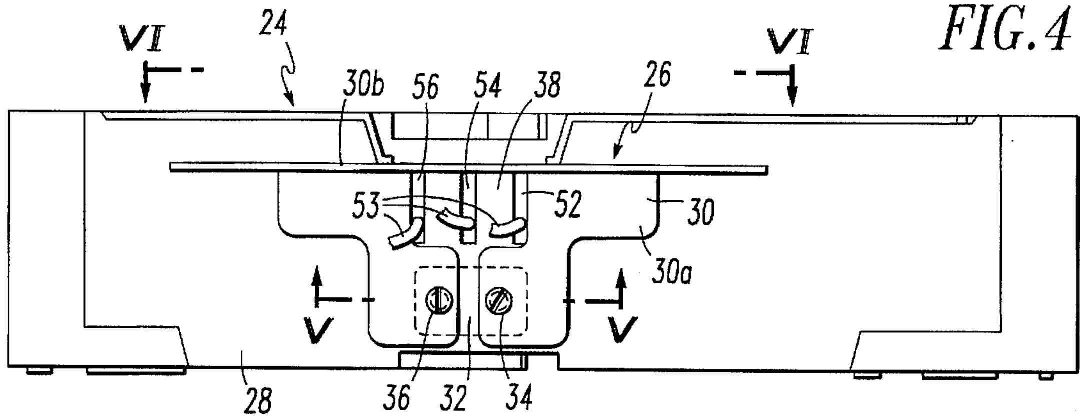
FIG. 4 is an elevational view similar to FIG. 2 illustrating a sidewall of a circuit breaker with the bracket assembly of the invention mounted thereon.

With particular reference to FIG. 4, bracket assembly 26 comprises a bracket member 30, a back-up plate 32, and fastening means, such as screws 34 and 36 which secure bracket member 30 and back-up plate 32 together in sidewall 28. Bracket member 30 has generally an L-shaped configuration with a leg portion **30*a* and a shelf portion 30*b*. Leg portion 30*a* has two members which are spaced apart and are configured to form an aperture 38 which communicates with an opening 40 of shelf portion 30*b* as shown in FIG. 6. Shelf portion 30*b* provides a flat surface and its length, preferably, is generally at least half the length of circuit breaker 26. Back-up plate 32 is generally flat and rectangular shaped and as shown in FIG. 3 has openings which cooperate with openings in the two members of leg portion 30*a* of bracket member 30 to receive screws 34,36 for securing bracket assembly 26 to sidewall 28 of circuit breaker 24**, more about which will be discussed hereinbelow.

Figure 5:
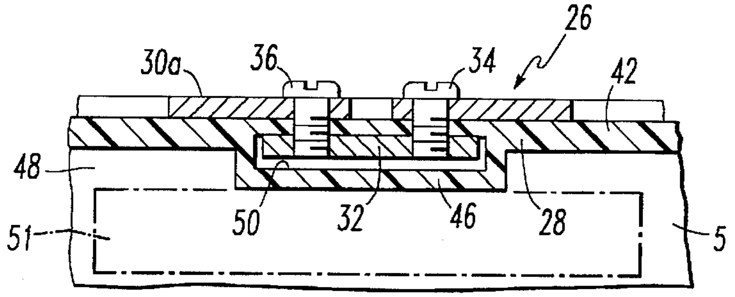
FIG. 5 is a partial sectional view taken along lines 5—5 of FIG. 4.
Figure 3:
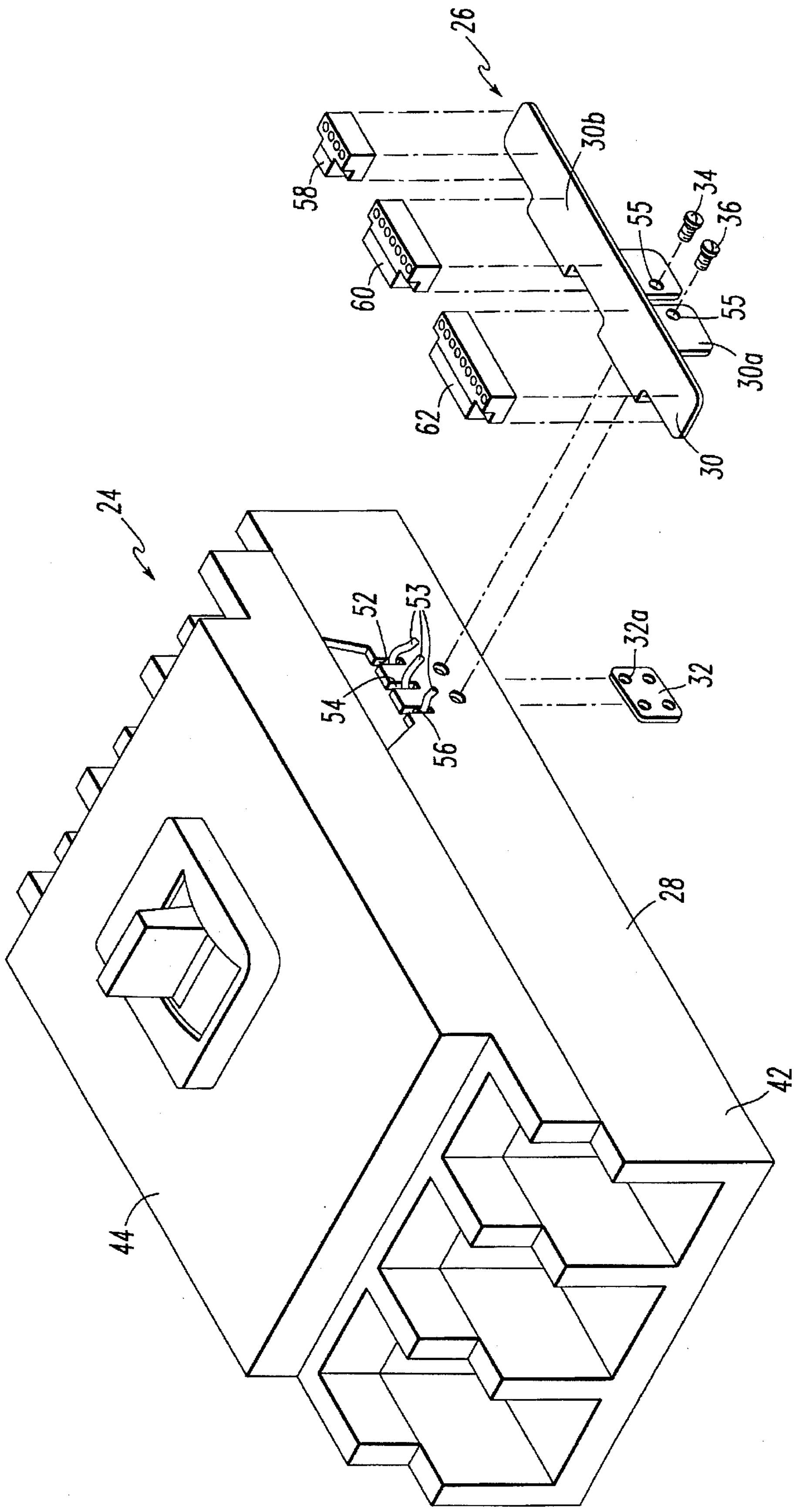
FIG. 3 is an osometric view showing the bracket assembly and the terminal block assemblies in exploded form.

With particular reference to FIG. 3, a base 42 of circuit breaker 24 cooperates with a cover 44 to form a molded case as is well known in the art. With particular reference to FIG. 5, base 42 has an inner wall 46 spaced inwardly from sidewall 28 to form a pocket 50. Inner wall 46 separates the pocket 50 from a cavity 48 containing the circuit breaker mechanism 51. As shown in FIG. 5, pocket 50 receives plate 32 of bracket assembly 26 and is totally electrically isolated from the cavity 48 of circuit breaker 24, and therefore, electrically isolated from the circuit breaker mechanism 51.

Pocket 50 is made between sidewall 28 and inner wall 46 along a peripheral edge of base 42 as shown in FIG. 5 and is accessed from underneath base 42 for insertion of plate 32 therein. Also, as shown in FIGS. 3 and 4, sidewall 28 has several spaced apart slots 52,54,56, which as mentioned hereinabove were used to mount the terminal block assembly 10 of the prior art of FIGS. 1A and 1B.

With reference to FIGS. 4 and 6, when bracket assembly 26 is mounted to sidewall 28, aperture 38 of bracket member 30 provides access to slots 52,54,56, and opening 40 in the shelf portion **30*b* of bracket member 30 provides access to aperture 38. These slots 52,54,56 allow leads 53 from circuit breaker 24 to be drawn through aperture 38 of bracket assembly 26. These wires 53 are electrically connected to one of terminal block assemblies 58, 60, and 62 which are supported by shelf portion 30*b* of bracket member 30**. The terminal blocks provide connections for leads (not shown) connected to an external electrical device, such as an auxiliary switch or an alarm, respectively.

In mounting bracket assembly 26 to base 42, leg portion **30*a* of bracket member 30 is placed against sidewall 28 of base 42, with aperture 38 of bracket member 30 framing slots 52, 54, and 56, so as to leave slots 52,54,56 accessible. Back-up plate 32 is inserted in the pocket 50 between inner wall 46 and sidewall 28 of base 42 from underneath, as shown in FIGS. 3, 4 and 5, until its holes, one of which is indicated at 32*a* in FIG. 3, are aligned with those in sidewall 28 and with one of the openings 55 (FIG. 3) in bracket member 30, and screws 34,36 are inserted into the aligned holes. The terminal block assemblies 58,60,62 are then mounted to shelf portion 30*b* of bracket member 30, and the wiring 53 from base 42 is connected thereto, the leads 53 being brought through slots 52,54,56 in sidewall 28 of base 42. From this and as shown in FIG. 5, it is appreciated that screws 34,36 remain outside of the cavity 48 containing the circuit breaker mechanism 51. In view of this, electrical isolation is maintained since back-up plate 32 is located in an electrically isolated pocket 50 in the sidewall 28 of the molded base 42 of circuit breaker 24, resulting in the bracket assembly 26 being electrically isolated from the circuit breaker mechanism 51. Since the bracket assembly 26 is electrically isolated, bracket member 30, back-up plate 32 and in particular screws 34,36** can be made of a metal, such as steel.

The manner in which bracket assembly 26 is mounted to base 42 of circuit breaker 24 allows a substantially long bracket member 30 for providing a mounting surface for several terminal block assemblies 58,60,62 to be fixedly secured to base 42 without wobbling.

Whereas particular embodiments of the present invention have been described for purposes of illustration, it will be appreciated by those skilled in the art that numerous variations of the details may be made without departing from the invention described in the appended claims.

In accordance with the patent statutes, I explained the principals and operation of my invention and have illustrated and described what I consider to be the best embodiment thereof.

What is claimed is:

1. A molded case circuit breaker comprising:
 a molded case having walls forming a cavity including an outer wall and an inner wall forming a pocket electrically insulated from said cavity;
 a circuit breaker mechanism contained in said cavity;
 terminal block means; and
 a mounting bracket assembly for securing said terminal block means to said molded case and comprising;
  a mounting bracket on which said terminal block means is mounted and having a leg portion bearing against said outer wall of said molded case in alignment with said pocket;
  a back-up plate received in said pocket; and
  fastening means extending from said leg portion of said mounting bracket through said outer wall and engaging said back-up plate in said pocket.

2. The molded case circuit breaker of claim 1 wherein said fastening means is made of metal.

3. The molded case circuit breaker of claim 1 wherein said back-up plate is a metal plate with tapped holes and said fastening means comprise metal screws engaging said tapped holes.

4. The molded case circuit breaker of claim 3 wherein said mounting bracket has a shelf portion extending outward from said leg portion and upon which said terminal block means is mounted.

5. The molded case circuit breaker of claim 4 wherein said leg portion of said mounting bracket has an opening through which leads from said circuit breaker mechanism pass to said terminal block means.

6. The molded case circuit breaker of claim 4 wherein said molded case has a first length, said mounting bracket has a second length at least about half the length of said molded case and said terminal block means comprises a plurality of terminal blocks, mounted on shelf portion.

7. A mounting bracket assembly for mounting terminal block means to a molded case circuit breaker having walls forming a cavity for a circuit breaker mechanism and having an inner wall and an outer wall forming a pocket electrically isolated from said cavity, said assembly comprising:

a mounting bracket on which said terminal block means is mounted and having a leg portion bearing against said outer wall in alignment with said pocket;

a back-up plate received in said pocket and fastening means extending from said leg portion of said mounting bracket through said outer wall and engaging said back-up plate.

8. The assembly of claim 7 wherein said fastening means is made of metal.

9. The assembly of claim 7 wherein said back-up plate is a metal plate having at least one tapped hole and wherein said fastening means comprises a metal screw engaging said at least one tapped hole.

10. The assembly of claim 7 wherein said mounting bracket has a half portion extending outward from said leg portion and upon which said terminal block means is mounted.

11. The assembly of claim 10 wherein said leg portion has an opening through which leads from said circuit breaker mechanism pass to said terminal block means.

12. The assembly of claim 11 wherein said shelf portion also has an opening through which said leads pass.

* * * * *